Figure 4:
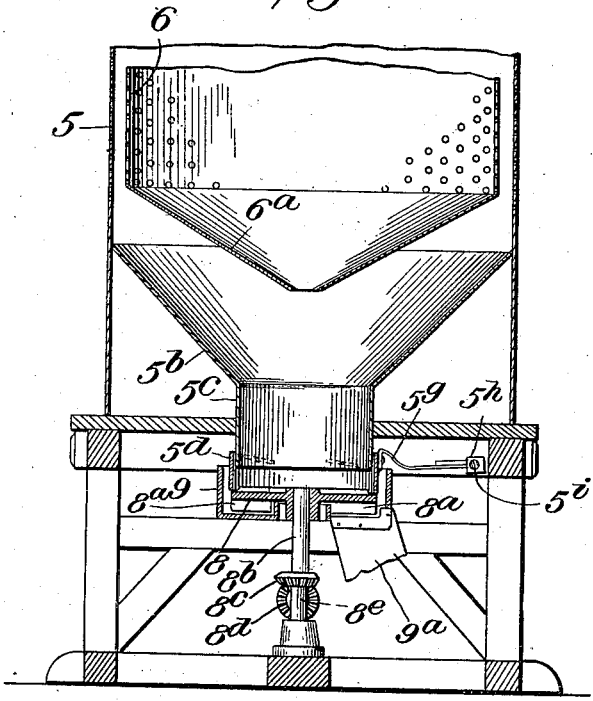

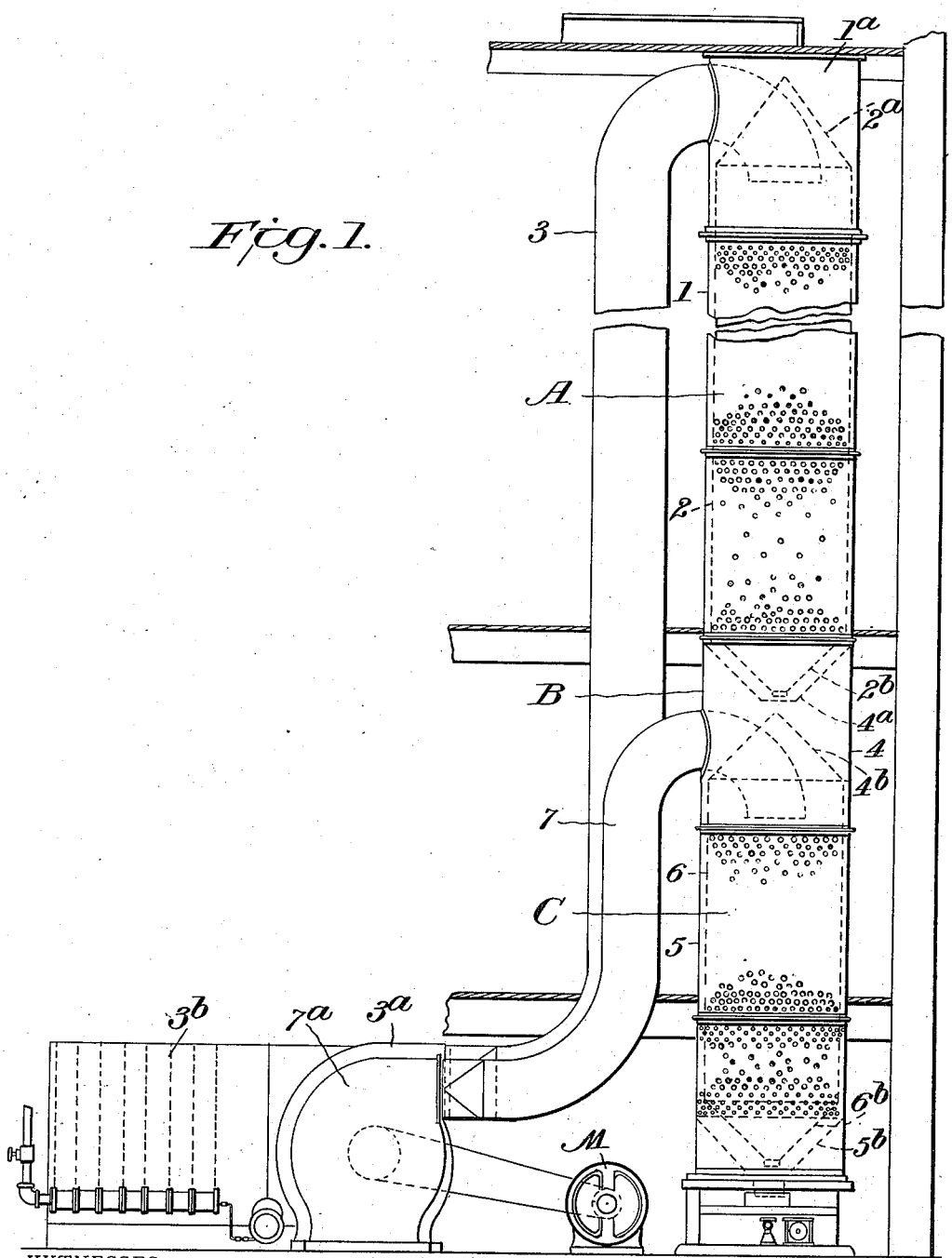

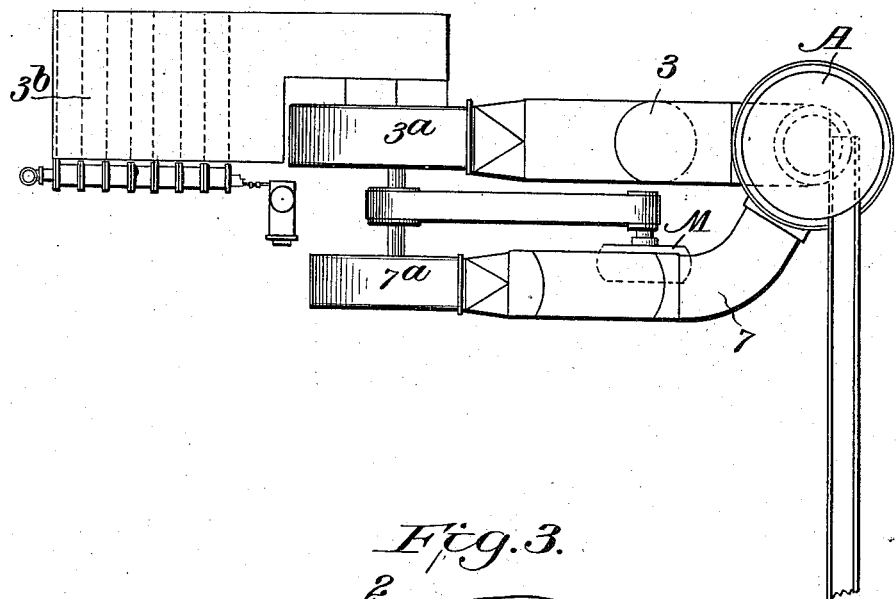
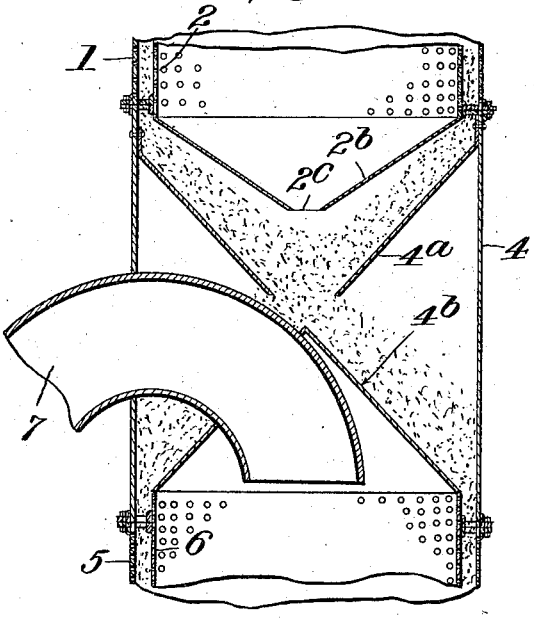

J. B. CORNWALL.
GRAIN DRIER.
APPLICATION FILED AUG. 5, 1911.

1,014,122.

Patented Jan. 9, 1912.
3 SHEETS—SHEET 3.

WITNESSES

INVENTOR
John B. Cornwall
By Alexander & Powell
Attorneys

UNITED STATES PATENT OFFICE.

JOHN B. CORNWALL, OF MOLINE, ILLINOIS, ASSIGNOR TO BARNARD AND LEAS MANUFACTURING COMPANY, OF MOLINE, ILLINOIS, A CORPORATION OF ILLINOIS.

GRAIN-DRIER.

1,014,122.  Specification of Letters Patent.  Patented Jan. 9, 1912.

Application filed August 5, 1911. Serial No. 642,527.

*To all whom it may concern:*

Be it known that I, JOHN B. CORNWALL, of Moline, in the county of Rock Island and State of Illinois, have invented certain new and useful Improvements in Grain-Driers; and I hereby declare that the following is a full, clear, and exact description thereof, reference being had to the accompanying drawings, which form part of this specification.

This invention is an improvement in grain driers constructed with a double wall tower having both its inner and outer walls perforated for the passage of air, the grain passing down the annular space between the inner and outer wall of the tower. There have been practical objections to this type of drier as heretofore constructed owing to the obstruction of the grain by the air pipes. It has been customary to make several entrances for the air through the walls and through the layer of grain passing between the two walls, in order to introduce the air inside of the inner wall, the air passing out through the walls and intermediate layer of grain, accomplishing the drying of the latter. Where this practice is followed the grain will collect or pyramid on top of the air pipes between the walls and stop the flow of grain at this point, there being no means for the grain to escape around the pipes as the annular space between the walls is entirely full. This makes the drier operate irregularly as it has a tendency to over-dry and injure a portion of the grain. In the present invention the air is introduced into the upper end of the tower above the annular layer of grain, the grain passing around the conical closure of the top of the inner wall into the channel between the two walls of the tower while the air is passed through this conical closure directly into the space inside the inner wall.

Where the tower is to be used both for heating and cooling grain, I employ a tower-section at the point of division which entirely separates the two processes, the cold air being introduced at this point into the lower section in the same manner that the hot air is introduced at the top of the tower. In this way I entirely eliminate any possibility of the grain pyramiding over the air pipes, and the annular passage for the grain is entirely unobstructed, consequently the flow of the grain is always regular and uniform.

The grain is discharged from the lower end of the tower by a revolving disk. The amount or rate of discharge is regulated by a sleeve on the end of the outlet pipe, which is raised or lowered, thus changing the space between the disk and the bottom of the pipe. In this way I am able to absolutely control the amount of grain passing through the drier so that grain requiring more or less treatment can be caused to reach any desired degree of dryness.

In the accompanying drawings, I have illustrated one practical form of apparatus embodying the invention, and will describe the same in detail and summarize the novel features and combination of parts for which I desire protection in the claims.

Figure 5:
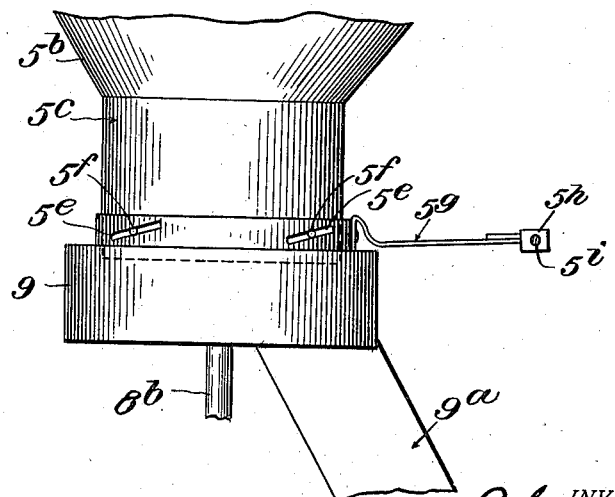

In said drawings: Figure 1 is a side elevation of the complete grain drier, partly broken away. Fig. 2 is a plan view of Fig. 1. Fig. 3 is an enlarged vertical sectional view of the intermediate section connecting the hot and cold air sections of the tower. Fig. 4 is an enlarged vertical section of the discharge end of the tower. Fig. 5 is a detail side view of the discharge devices.

The drying tower, as shown, is preferably composed of three principal sections, to wit, an upper heating or hot air section A; a lower cooling or cold air section C; and an intermediate intercepting section B. These sections are preferably cylindric in cross section.

The section A is composed of an outer perforated wall 1 and an inner perforated wall 2 which may be of reticulated metal and are preferably cylindrical in form and are spaced apart so as to leave between them a narrow annular space for the passage of grain. The upper end of the inner cylinder or wall 2 is closed by a conical cap $2^a$ which acts as a distributer for the grain, which is fed into the upper end of the tower by any suitable means. The upper part $1^a$ of the outer cylinder or wall 1, surrounding the cone $2^a$, is preferably imperforate. The cylinders or walls 1 and 2 may be formed in sections of any desired length united in any suitable manner, so as to make the section A of any desired height, according to the desired capacity of the drier. Hot air is admitted into the upper end of the cylinder 2 in section A by a pipe 3, which may be connected with any suitable hot air supply, (a heater 3$^b$ and blower 3$^a$ being indicated in the drawings), and such air passes down into cylinder 2 and escapes laterally therefrom and passes through the surrounding annular layer of grain,—heating and drying the latter,—and escapes through the perforations in the outer wall 1.

The grain may be fed into the upper end of section A, above cone 2$^a$ by any suitable means, and is distributed by said cone into the annular space between the walls and completely fills the latter and descends in an annular column uniformly and uninterruptedly through said space to the discharge, at the lower end of the section.

The section A can completely dry the grain but it is frequently desired to cool the grain after drying, and before storing it in bins, or sending it to the mill. Therefore I prefer to conduct the grain from the heating section A into a lower section C; and in order to effectually separate the hot and cold sections of the apparatus I provide an intermediate section B which consists of an outer imperforate cylinder or wall 4 connected to the lower end of wall 1. In this section B is an inverted conical hopper 4$^a$ which receives the grain from the lower end of section A; and above the conical hopper 4$^a$ is an inverted cone 2$^b$ which closes the lower end of the inner wall 2, but is preferably provided with a small aperture 2$^c$ at its bottom to permit any dust, etc., to escape into the hopper 4$^a$. The hopper 4$^a$ has a central opening through which the grain is discharged onto a cone 4$^b$ secured in the lower part of section B and which closes the upper end of the inner cylinder or wall 6 of the cooling section C.

The cooling section C is constructed substantially like the section A; having an outer annular perforated wall or cylinder 5 connected at top to the lower end of wall 4; and having an inner annular wall or cylinder 6 connected at top to cone 4$^b$, so that said cone 4$^b$ distributes the grain fed into section B uniformly into the annular space between the perforated walls 5 and 6 of section C, and the grain descends in an unbroken annular stream through said space to the lower end of section C, where it enters a discharge hopper 5$^b$, in the lower part of wall 5. The lower end of wall 6 is closed by an inverted cone 6$^b$ similar to cone 2$^b$. The cones 2$^b$, 4$^b$, 6$^b$, and hoppers 4$^a$, 5$^b$, are preferably imperforate. Cool air is admitted into the interior of the wall of cylinder 6 by a pipe 7, which passes through the wall 4 and enters cone 4$^b$.; said pipe 7 may be supplied with cool air in any desired way; as shown it is connected to a blower 7$^a$ beside blower 3$^a$, and both blowers 3$^a$, 7$^a$, may be driven from a common motor M.

The travel of the grain through the drier is regulated by means of a disk 8 mounted to rotate on a vertical shaft 8$^b$ below the outlet of hopper 5$^b$. Said disk 8 substantially closes the end of the outlet pipe 5$^c$ connected to the outlet of hopper 5$^b$. The space between the disk 8 and pipe 5$^c$ is regulable by a collar 5$^d$, which is loosely fitted on the lower end of pipe 5$^c$ and is connected therewith by means of inclined slots 5$^e$ engaging pins 5$^f$, so that if the collar is properly turned it can be raised, or lowered. The collar 5$^d$ may be rotated for adjustment by a lever 5$^g$ engaging a nut 5$^h$ on a hand operated screw shaft 5$^i$. The grain escapes under the lower edge of the collar 5$^d$ and over the edge of the disk 8, which may be rotated at a given speed by any suitable means. As shown shaft 8$^b$ is driven by bevel gears 8$^c$, 8$^d$, from a counter shaft 8$^e$, which could be belted to the motor M, or other suitable driver. The grain is discharged into a cup 9 surrounding the disk 8, and collar, and having an opening in its bottom communicating with a chute 9$^a$, by which the dried grain may be directed to any suitable receiver. The disk 8 may be provided with radial flanges 8$^a$ on its under side to sweep grain into the chute.

The operation of the drier will be obvious from the foregoing description; and its advantages are accuracy in operation; continuous and uniform movement of the grain; even and thorough drying of the grain; entire insulation of the hot and cold sections without retardation or change of direction of flow of grain in either direction; effective regulation of the feed of the grain through the drier; and through utilization of all the air admitted thereinto, either in drying or cooling.

What I claim is:

1. In a grain drier, the combination of an upper heating drying section and a lower cooling section, each having internal and external perforated walls; with an intermediate section having an imperforate wall, and a hopper in said intermediate section receiving grain from the upper heating section and discharging it into the lower section.

2. In a grain drier, the combination of an upper annular heating section, and a lower annular cooling section, each having internal and external perforated walls; an intermediate section having an imperforate wall, a hopper in said intermediate section receiving grain from the upper heating section, and an inverted cone receiving grain from said hopper and distributing it into the lower section; with means for introducing hot air into the upper section above the grain passage therein; means for introducing cool air into the lower section above the grain passage therein; and means for regulating the discharge of grain from said lower section.

3. In combination with a grain drier having a discharge outlet, a rotary disk below the outlet, means for rotating said disk, a cup surrounding the disk, a chute connected with said cup; said disk having flanges on its under side to direct grain into said chute.

4. The combination with a grain drier having a discharge pipe at bottom, of a rotary disk below the lower end of the pipe, means for rotating said disk, an adjustable collar on the lower end of the pipe for regulating the escape grain over the edge of said disk; a cup surrounding the disk, and a chute connected with said cup, substantially as described.

In testimony that I claim the foregoing as my own, I affix my signature in presence of two witnesses.

JOHN B. CORNWALL.

Witnesses:
M. H. ROMIG,
E. P. CHURCHILL.

Copies of this patent may be obtained for five cents each, by addressing the "Commissioner of Patents, Washington, D. C."